UNITED STATES PATENT OFFICE.

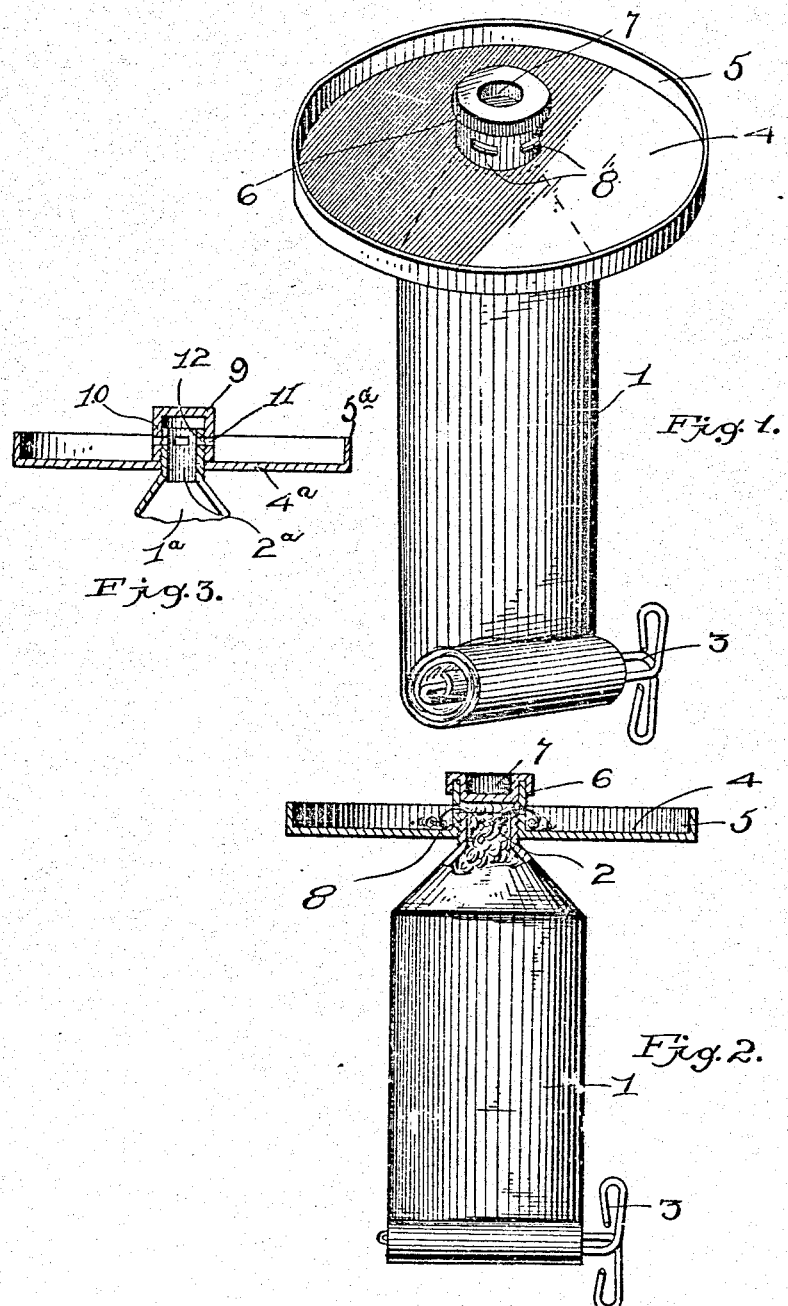

GEORGE OSBORNE HANNAH, OF ST. JOHN, NEW BRUNSWICK, CANADA.

BLACKING DEVICE.

967,764.  Specification of Letters Patent.  Patented Aug. 16, 1910.

Application filed November 24, 1909. Serial No. 529,827.

*To all whom it may concern:*

Be it known that I, GEORGE OSBORNE HANNAH, a subject of the King of England, residing at St. John, in the Province of New Brunswick, Canada, have invented certain new and useful Improvements in Blacking Devices, of which the following is a specification, reference being had therein to the accompanying drawing.

The present invention relates to devices for holding and delivering blacking, paint or the like, and has for its object the provision of means for facilitating the delivering of blacking or paint from a receptacle, in such a manner as to be easily accessible to the user.

Another object of this invention is the production of a disk adapted to be used in connection with a reservoir for receiving the contents thereof.

With these and other objects in view, this invention relates to certain novel constructions, combinations and arrangements of parts, as will be hereinafter fully described and claimed.

In the drawings Figure 1 is a perspective view of the complete device. Fig. 2 is a side elevation of the device showing the disk in section. Fig. 3 is a modification of the connecting means for the disk and reservoir.

Referring to the drawings by numerals 1 designates a reservoir which is provided at one end with a neck 2, which neck is preferably externally screw-threaded, as clearly shown in Fig. 2 of the drawing. The tube or reservoir 1 is provided at one end with a key 3 upon which is adapted to be rolled the yieldable tube or reservoir 1 for forcing the contents contained within the reservoir out of the spout or neck 2.

A disk member 4 is adapted to be connected to the reservoir 1 and said disk 4 is provided around the outer edge thereof with an annular flange or rim 5 which is adapted to hold any substance, which may be discharged from the reservoir, within or upon the disk 4. The rim 5 also allows the user of the device to easily grip the disk and rotate the same upon the neck 2 of the reservoir for screwing the same tightly upon said neck, or as, in the case of Fig. 3 for closing the openings hereinafter described. The disk 4 is provided centrally thereof with an upwardly extending collar 6 comprising a casing, and a cap 7 is placed upon the collar 6 for closing the upper end thereof. The side walls of the casing or collar 6 are provided with a plurality of elongated apertures 8 and the casing or collar 6 is internally threaded so as to receive the threaded neck 2 of the reservoir. It will be obvious therefore, that by rotating or turning the key 3 that the reservoir 1 can be rolled upon the key, and thereby force the contents within the reservoir out through the apertures 8 on to the disk 4 where it can be readily used.

In Fig. 3 I have shown an embodiment of my invention whereby the opening or discharge spout or neck $2^a$ of the reservoir can be closed by rotating the disk upon the same. The disk $4^a$ is provided centrally thereof with a closed casing 9 which casing is provided with side walls 10. The side walls 10 are provided with a plurality of apertures 11 which allow the contents of the reservoir $1^a$ to be discharged upon or within the disk $4^a$. The disk $4^a$ is also provided, like the structure shown in Figs. 1 and 2, with an annular rim or flange $5^a$. The neck $2^a$ of the reservoir $1^a$ is also provided with a plurality of apertures 12, which apertures are adapted to register with the apertures 11 of the casing 9 for allowing the contents of the reservoir $1^a$ to be discharged therefrom on to the disk $4^a$. The casing 9 is internally threaded and is therefore easily rotated upon the neck $2^a$ of the reservoir $1^a$, and when it is desired to close the openings in the casing 10 and prevent the contents of the reservoir $1^a$ from flowing therethrough, the disk $4^a$ is rotated upon the neck $2^a$ so as not to allow the apertures 11 and 12 to register.

From the foregoing description, it will be obvious that I have provided a movable device for carrying blacking, or paint or any similar substance, which can be readily taken apart and cleaned in case the same should become clogged.

The top of the cap 7 extends within the casing or collar 6 and has its under surface on the level with the top of the apertures 8 so as to direct the substance adapted to be forced through the casing, out through said apertures, as shown in Fig. 2. Of course the cap 7 can be secured to the casing 6 by soldering the same thereon or by securing the same thereto in any desired fashion.

It will be obvious by referring to Fig. 2 of the drawing that the contents will be forced directly out upon the disk 4 and will not settle around the apertures 8 and thereby clog the same and prevent the contents of the receptacle from being forced upon the disk. It will be further obvious that in the preferred embodiment shown in Fig. 2 that the bottom of the cap 7 will deflect the material so as to force the same directly out through the apertures 8.

What I claim is:—

1. In a device of the class described, the combination with a reservoir provided with a screw-threaded neck, said neck provided with a plurality of apertures formed in the sides thereof, of a disk provided with an upwardly extending centrally arranged integral casing, said casing being internally screw-threaded and provided with a plurality of apertures adapted to normally register with said apertures in said neck of said reservoir, and said disk adapted to be rotated upon the neck of said reservoir for closing the communication between the apertures in said casing with the apertures in the neck of said reservoir and preventing the flow of the substance contained within said reservoir through said apertures.

2. A portable blacking device comprising a reservoir, a disk, said disk provided with an upwardly extending casing rotatably mounted upon said reservoir, said disk provided upon its outer end with an upwardly extending annular rim, said casing provided with a plurality of outlet openings for allowing the material contained within the reservoir to be discharged therethrough.

In testimony whereof I hereunto affix my signature in presence of two witnesses.

GEORGE OSBORNE HANNAH.

Witnesses:
 MARY A. HANNAH,
 L. H. HAKE.